United States Patent [19]

Mailharin

[11] Patent Number: 5,391,398
[45] Date of Patent: Feb. 21, 1995

[54] METHOD OF COATING EXPANDED POLYSTYRENE PIECES

[75] Inventor: Gerard Mailharin, Villefranque, France

[73] Assignee: Societe Anonyme de Fonderies et Ateliers de Mousserolles, Bayonne, France

[21] Appl. No.: 940,179

[22] Filed: Sep. 3, 1992

[30] Foreign Application Priority Data

Sep. 9, 1991 [FR] France .................. 91 11095

[51] Int. Cl.⁶ .................. B05D 1/32; B05D 3/12
[52] U.S. Cl. .................. 427/244; 427/282; 427/300; 427/322; 427/421
[58] Field of Search ............. 427/421, 424, 282, 300, 427/322, 244

[56] References Cited

U.S. PATENT DOCUMENTS

| | | | |
|---|---|---|---|
| 4,395,184 | 7/1983 | Braden | 414/17 |
| 4,401,051 | 8/1983 | Gunther | 427/421 X |
| 4,572,762 | 2/1986 | Winston | 156/556 |
| 4,640,333 | 2/1987 | Martin et al. | 164/246 |

Primary Examiner—Bernard Pianalto

[57] ABSTRACT

Method for the glue spreading of expanded polystyrene pieces by means of spraying an aqueous solution of an adhesive, said method consisting of protecting the portions of the support on which the piece to be glued is placed by means of a film or layer of water, the water level not reaching that of the glue surface plane, so as to protect the surface from being soiled by a glue deposit.

Installation including a support having an indentation for the picking up and prepositioning of the part to be glued and immersed into a water tank equipped with feed means, water drainage overfill evacuation means, means for controlling the level activating said overfill evacuation means, and glue spraying means.

Application for assembling female molds for the production of foundry patterns for disposable patter type molding.

2 Claims, 3 Drawing Sheets

METHOD OF COATING EXPANDED POLYSTYRENE PIECES

FIELD OF THE INVENTION

The present invention concerns a method for the series mounting of molds by gluing expanded polystyrene pieces by spraying a solution of glue, an aqueous glue emulsion or suspension and also concerns installations to implement said method and more particularly concerns glue spreading installations. The method for gluing expanded polystyrene pieces by spraying a glue soluble in water is particularly well-adapted when it is desired to accurately control the thickness and homogeneity of the glue deposit and thus avoid any formation of glue rolls or edges along the mounting joint.

BACKGROUND OF THE INVENTION

Such a method applied for the mounting of expanded polystyrene clamshell-shaped molds for the production of foundry patterns for disposable pattern type molding is described in the patent application currently filed by the Applicant.

According to this method, an aqueous acrylic emulsion or suspension glue is sprayed onto the pieces to be glued by covering the entire surface of the joint with gem substance not exceeding 15 g/m2, the adhesive being dried by hot air scavenging and the pieces constituting the model being contact mounted.

Such methods do have a certain amount of drawbacks when screens or masks are used to prevent those zones not needing to be glued from being soiled by the glue deposit. In fact, the mask is unsuitable to curved glue spreading surfaces and its use rarely makes it possible to obtain sharp edges and it causes the droplets of the sprayed glue to rebound. The greatest drawback is soiling which requires that the mask be changed more frequently when the series work demands higher rates.

SUMMARY OF THE INVENTION

The method of the invention seeks to overcome the drawback of using a conventional mask by eliminating its use. According to the invention, the series mounting method by gluing expanded polystyrene pieces, whose portions to be glued emerge above the surface of the support of said pieces, by spraying an aqueous emulsion or suspension or a solution of a glue is characterized in that a film or layer of water is kept above the surface of the support, the level of this film or layer not reaching the level of the faces of the pieces to be glued forming the glue plane, so as to protect the surface of the support from being soiled by the glue deposit.

A support for pieces is understood to mean all the portions of the glue spreading machine surrounding the piece to be spread with glue and which would be likely to exhibit their surface to the unwanted glue deposit.

Thus, hydraulic protection of the pieces to be protected from soiling is provided, the droplets collected in the water being easily able to be removed, thus leaving the surface of the protected pieces clean without mould parting lines.

According to one advantageous application of the method of the invention, expanded polystyrene clamshell-shaped molds are assembled via this method for the production of foundry patterns for lost foam pattern type molding.

The invention also concerns an installation to implement such method and is characterized in that it includes a support for the piece to be glued placed in a water tank, feed and water drainage means and overfill evacuation means, means for controlling the level of water in the tank activating said water overfill evacuation means and glue spraying means placed above the support.

The means for controlling the level of water in the tank preferably include a level detector controlling water overfill evacuation. The support for the piece is advantageously a block provided with a pattern section retainer for picking up and prepositioning the piece to be glued.

Having regard to the low density of the expanded polystyrene, the support for the piece contains piece retention means, such as a piece clamping jack.

The invention also concerns an assembling installation for implementing the method of the invention and including a glue spreading station as described above, said assembly installation being characterized in that it includes a plate bearing the block with a pattern section retainer for picking up the piece and rotating with stoppages at working stations and surmounted by a turret head used as a support for connections of fluids fed by fixed devices placed above each working station and provided with vertical translation means, such as a pneumatic jack.

The assembling installation advantageously includes in the following order a station for loading the piece to be glued in the pattern section retainer of the block borne by the rotating plate, the glue spreading station, a hot air oven drying station and a station for mounting the clamshell-shaped mold glued to another clamshell-shaped mold.

Preferably, the connections supported by the rotating turret head are used to feed the tank with water and pneumatic jacks, such as the jacks controlling the feed and water draining valves, the jack controlling clamping of the piece to be glued in the indentation of the picking up block, the jack for assembling the pieces after gluing, the jack for the vertical translation of glue spraying nozzles and other jacks.

BRIEF DESCRIPTION OF THE DRAWINGS

Other characteristics of the method and installation of the invention shall appear more readily from a reading of the following description of an embodiment relating, by way of example, to a glue spreading installation embodied in an installation for assembling the expanded polystyrene clamshell-shaped molds and used as a lost foam pattern type foundry pattern. This assembling installation is shown on the accompanying drawings in which.

DETAILED DESCRIPTION OF THE PREFERRED EMBODIMENTS

The glue spreading installation of the invention forms part of an assembly installation including four working stations: the loading of the piece (station 1), glue spreading (station 2), oven drying (station 3) and assembling (station 4).

Figure 1:
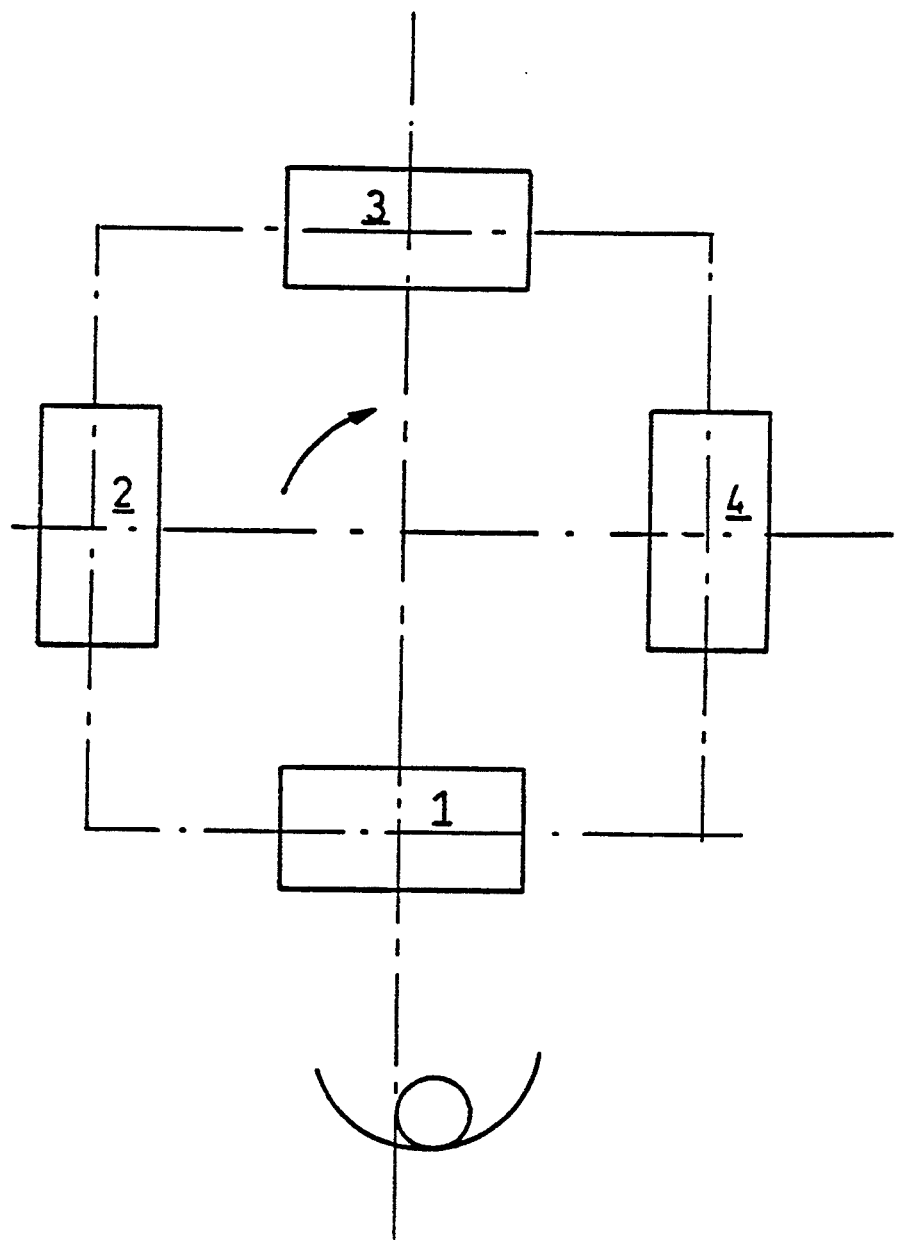
FIG. 1 diagrammatically shows the distribution of the working station in the circular path of a rotating plate, FIG. 2 diagrammatically shows a diametral section of two working stations.
Figure 2:
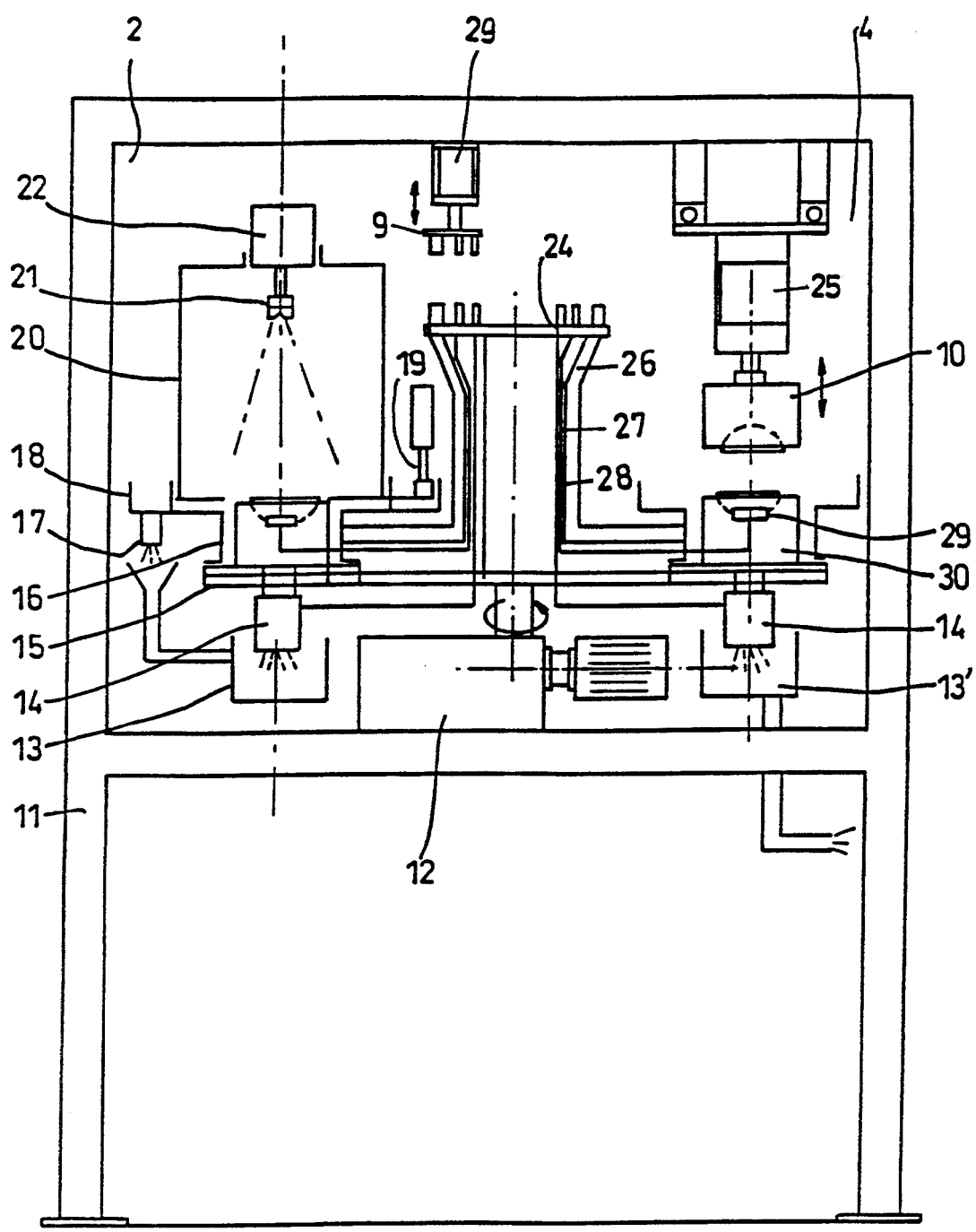

FIG. 2 shows the two working stations placed diametrically opposite each other, namely the glue spreading station 2 and the assembling station 4.

Inside a frame 11, a rotatable plate 15 is activated by a motor 12 and stops at each working station.

Figure 3:
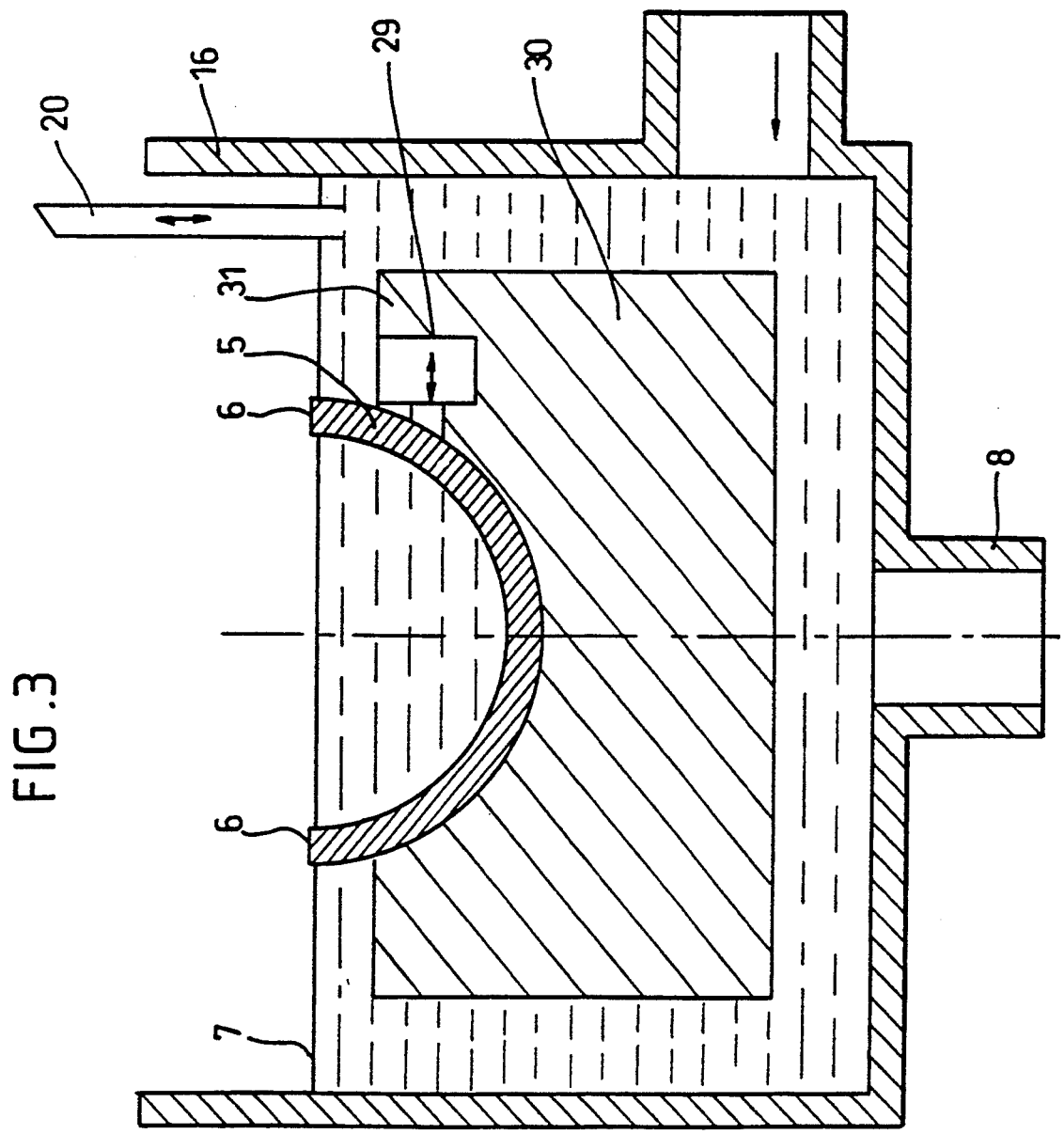
FIG. 3 shows on larger scale of a section of the support bearing the piece in a glue spreading position.

This plate bears a block 30, shown in FIGS. 2 and 3 provided with a pattern section retainer for picking up and prepositioning a female mold 5 and which involves coating the section 6 of the mold emerging slightly above the upper face 31 of the block 30. The block 30 is placed in a tank 16 fed with water and whose level is finely adjusted so as to be situated above the upper face 31 of the block 30 but below the level of the section 6 of the piece 5 to be glued. The block 30 is connected by a joining piece 8 passing below the plate 15 to a water recovery trough 13 by means of a valve 14 for draining the tank.

Placed at the top of the spraying chamber encompassed by retractable walls 20 is a glue sprayer whose nozzles 21 can be lifted up by means of a jack 22.

The rotating plate 15 bears at its center a turret head 24 supporting water pipes 26 for feeding the tank 16, air pipes 27 controlling the valve 14 for draining the tank 30 and air pipes 28 controlling the jack 29 for activating the retention means for clamping or sucking up the piece.

Placed above each working station is a fluid control and feeding distributor device 9 able to be moved vertically by means of a jack 23 and which feeds the pipes of the turret head 26, 27 and 28.

The water level detector in the tank 16 is shown at 19. This detector, functioning as a level contactor, controls stoppage of water feeding and water overfill evacuation to the valve 17 and the safety overfill vessel 18.

The station 3 is a station where heating of the glue film deposited at the station 2 is effected so as solidify said film and avoid any leakage.

The block 30 is positioned at the assembly station 4 opposite a block 10 for picking up the clamshell-shaped mold to be assembled with the glued clamshell-shaped mold 5.

The draining valve 14 is positioned above a water removal trough 13 for draining the block 30.

The support device 25 of the block 10 is lowered by a jack so as to exert slight pressure on the glued section 6 of the clamshell-shaped mold 5 and the corresponding face of the other female mold.

The functioning of the installation is as follows:

When the block 30 is immersed into the tank 16 situated in front of the loading station 1, a female mold is placed in the pattern section retainer of the block 30 and the clamping jack 29 is activated so as to hold in position the clamshell-shaped mold.

The block is made to pass to the glue spreading station 2 and the tank 16 is filled with water, the detector 19 ensuring that the water level is sufficient for covering the flat upper surface of the block 30 with a film of water but not reaching the level of the face of the section 6 of the clamshell-shaped mold to be glued.

The automatic action of this level adjustment is ensured by the fluid control and feeding distributor 9 and by the set of pneumatic jacks activating the overfill evacuation valves 27 and 28.

The spraying nozzles 21 are lowered by the jack 22 and starting of the sprayer is activated.

When the spraying operation has ended, the block 30 passes to the oven drying station 3 where hot air ensures solidification of the glue.

When the block 30 has passed to the assembly station 4, the valve 14 for evacuating water from the tank 16 is activated and the water flows into the trough 13' and then the block 10 bearing the other clamshell-shaped mold is lowered so as to ensure the two clamshell-shaped molds are glued together via contact.

When the clamping jack 29 is released, the two assembled clamshell-shaped molds are freed.

The method of the invention is able to eliminate the need for the use of masks, this resulting in achieving significant savings, especially as regards the costs of tooling and handling.

The method is extremely advantageous in eliminating any risk of soiling of portions of the glue spreading machine, the solubility of the glue in water constituting hydraulic protection and the actuation of droplets deposited during draining guaranteeing the absence of soiling, said method also being extremely simple to operate.

The invention is not merely limited to the embodiment given by way of example.

Numerous variants and improvements may be envisaged without departing from the context of the invention, said improvements concerning the precision and speed of adjustment of the water level according to the level of the glue spreading plane.

By means of such improvements, possibly also including the full automatic control of functioning and robotization of work task, such as the loading and unloading of pieces, it is possible to obtain extremely high rates in installations applying the principle of the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Method for the series mounting of expanded polystyrene pieces, comprising the steps of:
   mounting the pieces in a support having an upper surface;
   submerging the support in a container filled with water, such that a portion of each of said pieces to be glued emerges above the surface of the support and the water; and
   spraying an aqueous suspension, emulsion or solution of glue only on the portion of each of said pieces which emerges above the surface of the water, wherein the surface of the water is kept at a level above the surface of the support, the level of water not reaching that of the portions of the pieces to be glued forming the glue plane, so as to prevent the glue from striking the surface of the support in order to protect the support from being soiled by the glue deposit.

2. Method according to claim 1, wherein expanded polystyrene clamshell-shaped molds are assembled for the production of foundry patterns for a lost foam pattern type molding.

* * * * *